US007102067B2

(12) United States Patent
Gang et al.

(10) Patent No.: US 7,102,067 B2
(45) Date of Patent: *Sep. 5, 2006

(54) USING A SYSTEM FOR PREDICTION OF MUSICAL PREFERENCES FOR THE DISTRIBUTION OF MUSICAL CONTENT OVER CELLULAR NETWORKS

(75) Inventors: Dan Gang, Tel Aviv (IL); Daniel Lehmann, Jerusalem (IL)

(73) Assignee: MusicGenome.Com Inc., Wilmington, DE (US)

( * ) Notice: Subject to any disclaimer, the term of this patent is extended or adjusted under 35 U.S.C. 154(b) by 318 days.

This patent is subject to a terminal disclaimer.

(21) Appl. No.: 10/239,990

(22) PCT Filed: Jun. 29, 2001

(86) PCT No.: PCT/IL01/00605

§ 371 (c)(1),
(2), (4) Date: Sep. 27, 2002

(87) PCT Pub. No.: WO02/01439

PCT Pub. Date: Jan. 3, 2002

(65) Prior Publication Data

US 2003/0055516 A1    Mar. 20, 2003

(51) Int. Cl.
*G10K 15/02* (2006.01)

(52) U.S. Cl. .......................................... 84/600; 705/10
(58) Field of Classification Search .......... 84/600–609; 705/10
See application file for complete search history.

(56) References Cited

U.S. PATENT DOCUMENTS

| | | | |
|---|---|---|---|
| 4,996,642 A | 2/1991 | Hey | |
| 5,790,426 A * | 8/1998 | Robinson | 702/179 |
| 5,884,282 A * | 3/1999 | Robinson | 705/27 |
| 6,041,311 A * | 3/2000 | Chislenko et al. | 705/27 |
| 6,064,980 A * | 5/2000 | Jacobi et al. | 705/26 |
| 6,092,049 A * | 7/2000 | Chislenko et al. | 705/10 |
| 6,317,722 B1 * | 11/2001 | Jacobi et al. | 705/14 |
| 6,412,012 B1 | 6/2002 | Bieganski et al. | |
| 6,438,579 B1 * | 8/2002 | Hosken | 709/203 |
| 6,636,836 B1 | 10/2003 | Pyo | |
| 6,801,909 B1 | 10/2004 | Delgado et al. | |
| 2003/0021441 A1 * | 1/2003 | Levy et al. | 382/100 |

* cited by examiner

*Primary Examiner*—Marlon T. Fletcher
*Assistant Examiner*—David Warren

(57) ABSTRACT

A system and a method for predicting the musical taste and/or preferences of the user and its integration into services provided by a wireless network provider. Although the present application is directed toward implementations with wireless providers, the present invention can also be implemented on a regular, i.e., wireline network. The core of the present invention is a system capable of predicting whether a given user, i.e., customer, likes or does not like a specific song from a pre-analyzed catalog. Once such a prediction has been performed, those items that are predicted to be liked best by the user may be forwarded to the mobile device of the user on the cellular (or other wireless) network. The system maintains a database containing propriety information about the songs in the catalog and, most important, a description (profile) of the musical taste of each of its customers, identified by their cellular telephone number.

14 Claims, 2 Drawing Sheets

USING A SYSTEM FOR PREDICTION OF MUSICAL PREFERENCES FOR THE DISTRIBUTION OF MUSICAL CONTENT OVER CELLULAR NETWORKS

RELATED PATENT APPLICATION

This application is a National Phase Application of PCT Application PCT/IL01/00605 filed 29 Jun. 2001, International Publication No. WO 02/01439, International Publication Date 3 Jan. 2002.

FIELD OF THE INVENTION

The present invention relates to a system and a method for the prediction of musical preferences, and in particular, to such a system and method which is able to propose suitable choices of musical selections according to the preferences of the user, particularly for distribution over wireless networks.

BACKGROUND OF THE INVENTION

Music is a highly popular media on the Internet or World Wide Web (WWW). For example, file-sharing software programs and systems such as Napster, iMesh and Gnutella enable users to share digital files containing their favorite music. Other Web sites enable users to listen to free musical selections and/or to purchase music that is of interest and/or to burn custom CDs (compact disks). In addition, an increasing number of musicians are turning to the Internet in order to promote their music, particularly musicians who are associated with independent labels or "indies", who may not have access to the large commercial brick and mortar chains that sell music to the public.

Cellular networks of mobile phones represent an unexploited opportunity for distributing music and/or selling CDs and custom CDs, unlike e-commerce through the Internet, which is well developed. Since bandwidth and airtime are expensive, it is extremely beneficial in such an application to be able to limit the search for musical items to those items preferred or probably preferred by the customer. For a number of reasons, in particular the difficulty for the user to send data over the hand set by pushing keys on the set's keypad, and the high price of airtime, it is essential to be able to recognize a returning customer and send music of interest to this customer.

SUMMARY OF THE INVENTION

The background art neither teaches nor suggests a method for accurately predicting the musical taste and/or preferences of a user. The background art also does not teach or suggest search services for cellular telephone operators or m-commerce vendors (for purchasing music through a cellular telephone).

The present invention overcomes these disadvantages of the background art by providing a system and a method for predicting the musical taste and/or preferences of the user and its integration into services provided by a wireless network provider. Although the present application is directed toward implementations with wireless providers, the present invention can also be implemented on a regular, i.e., wireline, network. The core of the present invention is a system capable of predicting whether a given user, i.e., customer, likes or does not like a specific song from a pre-analyzed catalog. Once such a prediction has been performed, those items that are predicted to be liked best by the user may be forwarded to the mobile device of the user on the cellular (or other wireless) network. The system maintains a database containing proprietary information about the songs in the catalog and, most important, a description (profile) of the musical taste of each of its customers, identified by their cellular telephone number.

For example, preferably a short sample of music, optionally of low quality, is broadcast to the user. The user then decides how to handle this song, for example whether to discard it, buy the related CD, or save the reference to the song for future use. The user could also optionally request music related to the profile of another user, in order to select such music to be sent to the other user, by identifying the user (and hence the profile) according to the cellular phone number of the user. The present invention can also optionally be used to deliver targeted musical content over the mobile device, for example through a cellular network or cable network, or another type of preferably wireless network.

Hereinafter, the term "musical selection" refers to a song, a piece of music, or a portion thereof.

Hereinafter, the term "network" refers to a connection between any two or more computational devices which permits the transmission of data.

Hereinafter, the term "computational device" includes, but is not limited to, personal computers (PC) having an operating system such as DOS, Windows™, OS/2™ or Linux; Macintosh™ computers; computers having JAVA™-OS as the operating system; graphical workstations such as the computers of Sun Microsystems™ and Silicon Graphics™, and other computers having some version of the UNIX operating system such as AIX™ or SOLARIS™ of Sun Microsystems™; or any other known and available operating system, or any device, including but not limited to: laptops, hand-held computers, PDA (personal data assistant) devices, cellular telephones, any type of WAP (wireless application protocol) enabled device, wearable computers of any sort, which can be connected to a network as previously defined and which has an operating system. Hereinafter, the term "Windows™" includes but is not limited to Windows95™, Windows NT™, Windows98™, Windows CE™, Windows2000™, and any upgraded versions of these operating systems by Microsoft Corp. (USA).

For the present invention, a software application could be written in substantially any suitable programming language, which could easily be selected by one of ordinary skill in the art. The programming language chosen should be compatible with the computational device according to which the software application is executed. Examples of suitable programming languages include, but are not limited to, C, C++ and Java.

In addition, the present invention could be implemented as software, firmware or hardware, or as a combination thereof For any of these implementations, the functional steps performed by the method could be described as a plurality of instructions performed by a data processor.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
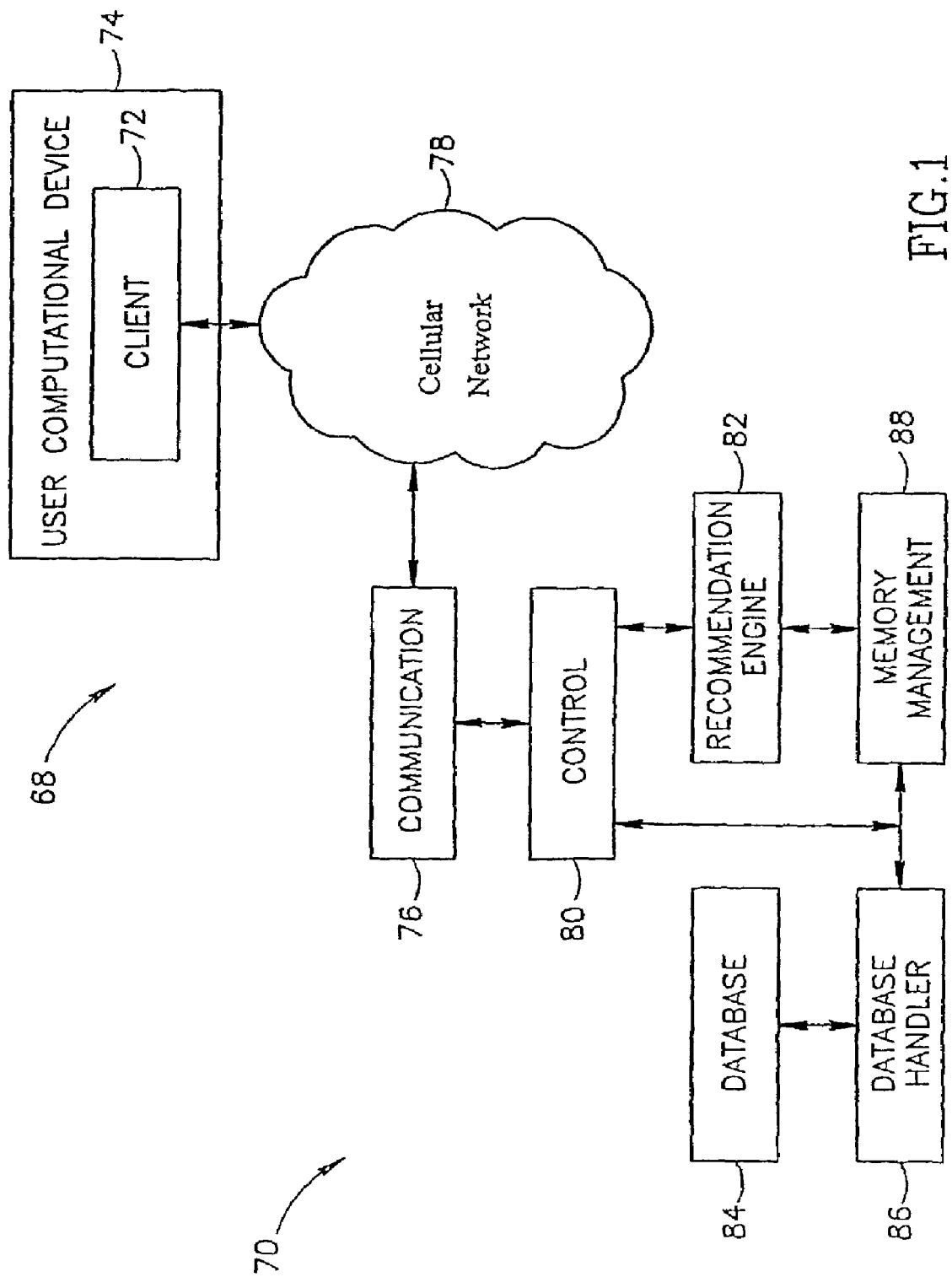
FIG. 1 is a schematic block diagram of an exemplary system according to the present invention.

The present invention is of a system and a method for predicting the musical taste and/or preferences of the user and its integration into services provided by a wireless network provider. Although the present application is directed toward implementations with wireless providers, the present invention can also be implemented on a regular, i.e., wireline, network. The core of the present invention is a system capable of predicting whether a given user, i.e., customer, likes or does not like a specific song from a pre-analyzed catalog. Once such a prediction has been performed, those items that are predicted to be liked best by the user may be forwarded to the mobile device of the user on the cellular (or other wireless) network. The system maintains a database containing proprietary information about the songs in the catalog and, most important, a description (profile) of the musical taste of each of its customers, identified by their cellular telephone number.

Introduction to Solutions

The present invention optionally includes one or more of a number of different solutions to the recommendation problem. Each such solution gathers data of one or more types concerning the characteristic(s) of each song, and the relationship between these characteristic(s) and the perception of the listeners, or their musical taste. The solution may then optionally be used to predict additional song(s) which may be of interest to the user. It should be noted that although the following description centers around prediction and recommendation of songs (musical selections), in fact the present invention is also extensible to other interests of users which involve subject issues of "taste" for any type of media selection.

Preferably, at least one of three different families of methods, Neural Network methods, Map methods (SM, FeatM and/or FingM) and Rating (R), are used. More preferably, two or more such families of methods are used conjunctively to achieve the best performance. Preferred aspects of the PMT system include, but are not limited to, the feature base that preferably includes the definition of a large number of musical features by which trained musicians classify the musical items and the optional use of a Neural Network or other fuzzy logic to learn the taste of an individual based on a sample of preferred musical selections. Another preferred aspect of the PMT system more preferably includes Map methods which are based on building a matrix of "pseudo-distances" between all pairs of songs of part of or the totality of the catalog. Most preferably, one or more methods of the following three different methods for building such matrices are used, each of which uses different types of information.

The different methods of the Map family include the "Finger Map" method, in which the pseudo-distance between two songs is determined automatically as the distance between two "fingerprints", without any human intervention. Another preferred method is the "Feature Map" method in which the pseudo-distance is determined as the distance between two vectors of predefined musical features characterizing the respective songs. These vectors are more preferably generated by trained musicians or other trained personnel who listened to the songs. Yet another preferred method is the "Song Map" method, in which the pseudo-distance is determined as the average difference of the ratings given to any pair (or more) of songs by a group of individuals (trained or otherwise). The rating of a song reflects how much the individual rating the song likes this song.

According to preferred embodiments of the present invention, the musical taste and/or preferences of the user are predicted according to the reactions of the user to a set of musical selections. These musical selections, to be presented to the user for rating, may optionally be chosen completely randomly from the catalog of musical items, or alternatively may be selected in a guided manner, in order to cover the breadth of the range of musical items in the catalog. For such a selection, more preferably coverage is arranged according to the requirements of one of the previously described methods. The present invention is then able to predict the musical taste of the user for other musical selections from the catalog.

As described in greater detail below, the present invention is able to overcome a large number of problems that are inherent to the concept of predicting the musical taste and/or preferences of a user. First, given a large catalog of musical items and a small sample of selected items for determining the taste of an individual, the first such problem is that of forecasting the taste of the individual on the whole catalog, which is the forecast problem. A different problem is the recommendation problem: how to recommend a relatively (to the size of the catalog) small number of items that have the best chance to fit the individual's taste. Conceptually, the PMT system solves the recommendation problem by solving the forecasting problem first, and then recommending the items which are forecast to best fit the taste of the user. This holds true for the preferred implementations of the methods as described below: Rating, neural net, and the different Map methods and combinations of the above.

Testing Solutions to the Recommendation Problem

According to the preferred implementation of the present invention, the recommendation problem is more preferably solved without solving the forecast problem in full. Most preferably, the forecast problem is solved exactly only for songs with a good probability of being liked by the specific user.

To be able to compare different possible solutions to the problems above, the taste of an individual is preferably assumed to be defined by a function that assigns a number in the interval [0, 1] to each and every item in the catalog. In the tests of the present invention which is described in greater detail below, the five values, "likes a great deal", "likes", "indifferent", "does not like" and "cannot stand (dislikes)", were translated as 1, 0.75, 0.5, 0.25 and 0 respectively. Different tests of the system have been implemented, in each of them, a number (from 28 to 32) of subjects have been asked to reveal their personal taste on a catalog of (from 2200 to 5570) songs. A set of songs (preferably small, but whose size may be varied) is chosen as a "learning set" and the system is more preferably given the taste of the subjects on those items only. The PMT system is not given the subjects' taste on the other items, "the generalization set". The PMT system then forecasts each subject's taste on this generalization set, and recommends a number of items to each of the subjects. For those items the "target", i.e., the taste expressed by the subject in the test, is compared to the forecast of the PMT system. The results obtained from these different tests were all very similar and are reported as for a single test.

The criteria by which to judge the quality of the solutions to the two problems described above have been chosen carefully. The PMT system preferably uses the $l_1$-distance to judge the quality of a solution to the forecast problem. A Euclidean distance may optionally be used as well. The $l_1$-distance between a target vector $t_i$ and a forecast vector $f_i$ is:

$$\Sigma_i |target_i - forecast_i|/n$$

wherein the sum ranges over i=1 . . . n, and n is the size of the generalization set (number of items in that set); and the function "| |" is the absolute value function.

The quality of a solution to the forecast problem is this distance between target and forecast averaged over a large number of trials with different samples of the individual tastes and over the different individuals. This is a number in the interval [0, 1]: the smaller the number, the better the solution.

There are at least two criteria by which the quality of a solution to the recommendation problem should be judged. The first criterion by which to judge such a solution is the average of the target values over the items recommended. The average target value is a number between zero and one; the larger the number, the better the recommendation. If this number is one, for example, all the items recommended were in fact "preferred" by the subject and the system has been completely successful. This number measures the goodness of the recommendations. Another important criterion is the individual quality of the recommendation, or whether the system recommends the same items to every subject as opposed to being very sensitive to the individual taste of the subject. The best measure of this criterion is the spread of the recommendations, i.e., how many different items were recommended, on the whole, to the community of subjects. If 10 different items are recommended to each member of a set of 32 subjects yet only 25 different items are recommended overall, out of the total of 5570 available items and the theoretical maximum of 320 different recommendations, then the same item has been recommended to many different subjects, while many items have not been recommended to anyone. Such a small spread should preferably be avoided. Indeed, larger spreads are strongly preferred.

The present invention was tested with a group of 32 subjects, who were asked to rate each song on a scale of five values: likes a great deal, likes, indifferent, does not like, and hates. The songs of the catalog included the currently most popular tracks worldwide, with most songs being in English, but with a significant number of songs in Spanish, French, Hebrew, Portuguese and other languages. The songs included different genres: rock, pop, jazz, acoustic and electric items, rap, funk, reggae and classical. The results are described in greater detail below with regard to each method.

The first such method is the neural net method, which uses a neural network, or fuzzy logic, to learn the individual's taste from a (preferably small) sample of preferred musical items. Each item (song) is characterized by its musical features (a binary vector) and the Neural Network learns, from the sample, to associate a taste (between zero and one) to sets of musical features. Further description of the musical features and their analysis can be found below in the description of the Feature Map method. The basic algorithm is back-propagation [LeCun:85, BackProp:86]. The architecture of the neural network includes a number of input units which are equal to the number of musical features, preferably including one, two or three hidden units and a single output unit. The learning examples are presented repeatedly to the neural network and a gradient-descent (back-propagation) algorithm is used to minimize the learning error. For generalization, the network is presented with the features of the song for which the taste of the user is to be predicted. The neural network then computes in a feed-forward manner the predicted rating (i.e. taste) for the user.

In order to test this method, a sample of 5, or 40 songs was chosen (randomly) in the catalog of 5570 items and the PMT system was given the taste (between zero and one) of each of the 32 subjects on this sample. It was then asked to forecast the subject's taste on the remainder of the catalog (the generalization set). The neural net method was found to forecast the taste of individuals significantly better than a random guess. A random guess gives, on the test data described above, an average distance between output and target of 0.14, independently of the size of the learning set. The neural net method gives, for a learning set of size 5, an average of 0.13. For a learning set of size 40, it gives the same value. The difference is significant. The reason is that the neural net system learns reasonably well the musical features preferred by an individual but this is far from enough to define the taste of an individual: many items share similar features and an individual may be expected to have different opinions about different items, even if they share the same features.

On the recommendation problem, for a learning set of size 5, the neural net method performs significantly better than a random guess: it achieves an average of forecasted values of 0.52 whereas a random guess would yield 0.46. For a learning set of size above 20, it obtains an average of 0.6. This result is not as good as for other implementations of the present invention. The reason is both that the neural net methodology does not succeed in extracting all the information available and that the items that fit the musical features preferred by the individual are not necessarily those items which are preferred by the user. Many items that fit closely the musical features preferred by the individual are not, in fact, preferred because of their poor overall quality. The spread obtained by the neural net method is very good, though: of the order of 72% of the maximum number of possible different recommendations for 10 recommendations on the basis of a learning set of size 5 or 40. The neural net method learns to distinguish the musical features that an individual generally likes or dislikes, but is not the best method for forecasting the taste of the user and/or recommending songs to the user.

A second family of methods includes the Map methods, for forecasting. Such methods represent significant improvements on the Artist-Artist methods of [CollFilt:95]. Among the crucial differences between the background art method and the method of the present invention are recommendation of specific songs, i.e., tracks, rather than artists or albums. Also, the present invention does not use a Constrained Pearson r Algorithm but instead uses a $l_1$ distance. Furthermore, the gathered information about the catalog of musical items is different in the present invention from the background art method, as the latter relies on ratings haphazardly gathered from a large number of users who rated only a small portion of the catalog, while the present invention preferably uses one or more of the following: ratings gathered from a small but fixed number of persons each of whom rated a large part of the catalog, ratings from the analysis of the musical items by trained musicians (and/or other trained personnel), and/or fully automatic techniques based on fingerprinting.

As previously described, these methods use a matrix whose entries are "pseudo-distances", for each pair of songs. This matrix is the only information about the catalog that is used in solving the prediction and recommendation tasks.

The different methods of the family differ in the type of information used in computing those pseudo-distances. The general idea is that the pseudo-distance between songs i and j is small if, typically, a user who likes i is also expected to like j, while a user who dislikes i is also expected to dislike j and vice versa.

The "pseudo-distances" generated by different methods may also be optionally and preferably combined, by some weighted linear calculation for example, to define a new pseudo-distance.

The following discussion describes first how pseudo-distances are used to solve the forecasting problem, and then how the different methods of the invention compute those pseudo-distances.

Given a matrix of pseudo-distances d(i,j) and a vector of ratings of some of the songs: $r(k_1), \ldots, r(k_n)$ where r(k) is the rating given by the user to song k, the forecasted rating (for the user) of song i is the weighted average of the ratings $r(k_1), \ldots, r(k_n)$ where r(k) is weighted by a quantity that is inversely proportional to some fixed power of d(k,i). In other terms, the forecast for the rating of song i is given by:

$$c \left[ \sum_{j=1}^{n} r(k_j) / d(k_j, i)^{\alpha} \right]$$

where $\alpha$ is a positive real number and c is a normalizing factor:

$$c = 1 \div \sum_{j=1}^{n} (1 / d(k_j, i)^{\alpha}).$$

We found that taking for $\alpha$ a value close to 10 gives the best results for the SongMap method. For Feature Map and Finger Map the best values are smaller. Of course, other values could optionally be used and are considered to be within the scope of the present invention.

As previously described, optionally and preferably one or more of three different methods for building the matrix of pseudo-distances is used for the present invention. The first method, Song Map, gives the best results, but is also the most expensive to implement because of the cost of acquiring the data needed to build the matrix of pseudo-distances. The method requires a minimum number of subjects (15 is a minimum and about 35 seems optimal) who have listened to, and graded on a scale of zero to one, each item (song). The quality of the recommendations is a function of the number of subjects, and their variety: subjects that have different tastes should preferably be chosen. The data may be assembled from a much larger set of subjects who have graded only part of the catalog, but each pair of songs should have been rated by at least 15 subjects. This data is used to build a Song Map, i.e., a matrix of pseudo-distances describing the "distance" (or the closeness) of every pair of items. Items are close if, on the average, subjects who like one of them also like the other one, and those who dislike one also dislike the other. Technically the pseudo-distance between two songs i and j is defined as:

$d(i,j)=\Sigma_k |g_i^k - g_j^k|$ where k runs over all the subjects and $g_i^k$ is the grade given by subject k to song i. If every subject gave exactly the same grade to both songs i and j then their distance is zero.

Forecasting by the Song-Map method gives much better results than by the neural net method. For a learning set of size 5 it gives an average distance between forecast and target of 0.0725. For a learning set of 40, it gives an even better average distance 0.0575. The SM method also gives an excellent solution to the recommendation problem. As mentioned above, recommendations are taken to be those songs that got the highest forecast. For 5 recommendations on the basis of a learning set of size 10, the average of the forecasted values of the recommended items is 0.62 and the spread is 27. For a learning set of size 40, the average of the forecasted values is 0.75 and the spread is 32. For a learning set of size 80 the average forecasted value of recommendations is 0.78.

The second of the optional but preferred Map methods is the Feature Map. In this method, the pseudo-distance between two songs is computed on the basis of the analysis of the songs, preferably by professional musicians and/or other trained personnel, in terms of a set of predefined musical features. Different songs may be analyzed by different musicians (personnel), but these individuals are preferably trained to recognize the musical features whose careful definition is a central part of the PMT system. The Feature Map is based on the same information which is required to apply the neural net method: analysis by trained musicians or other trained personnel, according to a set of predefined features. Preferably, only one musician listens to any single song and different musicians may optionally analyze different songs: they build a feature base which is the definition of musically significant features and the mapping of every item in the catalog according to those features by trained musicians. Some of those features are optionally and preferably obtained from available outside information, but most of them are more preferably defined by the PMT system. Some of those features are objective and are therefore preferably described by a binary system (either zero or one), but other features are subjective and their value is preferably taken as the average of the values given by a number of musicians. The Appendix contains a description of the current set of features. The Feature Map method has been shown to give better recommendations than the neural net method of the present invention.

Technically, every song is characterized by a vector of numbers in the interval [0,1]. The vector, in the current implementation, contains about 100 numbers, each of them being either 0 or 1. Each number corresponds to the musical features described in the Appendix. The pseudo-distance between two songs is taken to be the $l_1$ distance (or the Euclidean distance) between the two corresponding Boolean vectors. Two songs that have exactly the same musical features have a distance of 0 and songs that differ in only one musical feature have a distance of 1, for example.

The Feature Map method is different from the Song Map method described above. The Feature Map describes musical proximity, whereas the Song Map describes the tastes of a plurality of users. The Feature Map method provides recommendations of value 0.56 on the basis of a learning set of size 10, value 0.64 for a learning set of size 40 and 0.66 for a set of size 80. Comparing those values with the values obtained from the Song Map method: 0.62, 0.75 and 0.78 respectively, the Feature Map clearly gives significantly inferior results. The difference becomes even more significant for large learning sets.

However, after considering a number of possible other methods, the results obtained from the Feature Map appear to represent the best for any recommendation system based on a purely musical analysis of the catalog. The reason any such method is essentially limited in its quality is that the information on which it is based, musical features, cannot fully explain the taste of a user. Musical similarity is only partly useful for explaining musical taste. The spread found in the Feature Map is large and very satisfactory.

The Finger Map is the third of the Map methods. In this method, no human intervention is needed in building the matrix of pseudo-distances. Each song is "fingerprinted" by analyzing the audio signal of the musical selection. Fingerprinting is a public domain technique used for identifying songs, tracks or audio files. A computer program, such as from the Songprint library distributed by Freetantrum.com for example, reads the audio file and computes a "fingerprint" consisting of, typically, 32 positive integer numbers according to the audio signal of the file. Those numbers are a unique "signature" of the musical item, since a specific recording of a song is expected to generate the same, or almost the same, signature even if the file has been converted to another format. Different songs or different recordings of the same song are expected to produce different signatures.

The numbers in the "fingerprint" are preferably calculated as follows: the Fourier transform of the audio signal is computed and the energy contained in each of a number (typically 16) of frequency bands is computed as a function of time. Both the average (over time) and the standard deviation of this energy are computed in each of the 16 bands, resulting in 32 numbers. Those numbers are then normalized to enable comparisons between "fingerprints" of songs with different average energy, i.e., volume. The "fingerprint" is typically taken on only part (for example, half a minute) of the song. Given the "fingerprints" of the songs of the catalog, the pseudo-distance between two songs is defined as the distance ($l_1$ or Euclidean) between the two vectors of 32 numbers.

The main advantage of the Finger Map method is that the matrix of pseudo-distances is built completely automatically without human intervention. The Finger Map method takes advantage of the fact that songs that have fingerprints whose distance is small typically sound similar. The quality of the predictions is inferior to that of the other methods of the Map family. For learning sets of sizes 10, 40, 80, recommendations of value 0.53, 0.57 and 0.59 are obtained respectively. This represents a performance that is inferior to the Feature Map method.

A method of a third family is the rating method, which is actually quite simple. It does not even need a sample set of the individual's taste. The method uses only a Rating list that describes, for every item in the catalog, preference by the subjects on average. In a test, for each song, the average rating given to it by the 32 subjects was used. Any information about the popularity of the different items may also optionally be used, such as information gathered either from outside sources or by a test on an inside group of subjects, for example. If, for example, individuals in a large group are known to "like" (1), "don't like" (0) or are "indifferent" (0.5) to a song, the popularity (i.e. rating) of the song is optionally and preferably calculated as the average of those numbers over the population. This information is then normalized to fit the interval [0, 1] by subtracting the smallest popularity value and dividing by the difference between the largest and the smallest popularity values. The forecast for a song is simply taken to be the song's normalized popularity (i.e. rating). The basic rationale for this method is that there is some objective quality in the different items that is reasonably approximated by the rating and that this objective quality is the best predictor for an individual's taste. This method forecasts the same taste for every individual.

The Rating method performs quite well on the forecast problem. It gives an average distance between target and forecast of 0.31, which is significantly better than the neural net method. The performance of the Song Map method is significantly better, though. On the recommendation problem, it achieves an average forecasted value of 0.8, much better than the neural net method and better than the SM method. The spread, though, is, obviously minimal and unacceptable. The reason for the relative success of the Rating method is clear: in a large measure, individual taste is determined by some objective quality of the items, on which subjects may be expected to agree to at least some degree.

Assuming ratings of the items in the catalog have been obtained from a number of persons, each of whom has rated a large part of the catalog, a family of methods based on the following idea may also be used: the prediction for song I for a given user is a weighted average of the grades given to song I by the different raters. The weight of each rater is inversely proportional to some positive power of the distance between the specific user and the rater, a distance which is measured from a small learning set of songs. When ratings are gathered systematically as proposed here, this method provides better results than the usual Collaborative Filtering techniques based on haphazardly gathered data.

Previously, five different methods of the present invention have been described: neural net, SM, FeatM, FinM and R. According to preferred embodiments of the present invention, two or more, and more preferably all, of these methods are combined, into a system that offers the advantages of each. The combination of the different methods is optionally very simple. Each of the methods proposes a forecast that is a number in the interval [0, 1]. A linear combination of those three values is used as a forecast of the taste of the individual. Assuming only neural net, SM and R are used, if $f_{neural\ net}$, $f_{SM}$ and $f_R$ are the forecasts of the neural net, SM and R methods respectively, the forecast of the PMT system is:

$$c_{neural\ net} f_{neural\ net} + c_{SM} f_{SM} + c_R f_R,$$ for positive numbers $c_{neural\ net}$, $c_{SM}$ and $c_R$ such that: $c_{neural\ net} + c_{SM} + c_R = 1$. Many different values for those three coefficients are currently being tested in order to determine those values that offer best performance on the recommendation problem. In principle the exact optimal values for those coefficients depend on the parameters of the problem at hand: size of the catalog, rating information available and others, but this influence seems to be small.

Dealing with Very Large Catalogs with the Map Methods

The Map methods, as described above, require the computation of a matrix of pseudo-distances between each pair of songs. For large catalogs these methods need to be adapted for two reasons. First, the matrix may be too large to be stored in memory; and secondly because, in the SM method, raters need to preferably rate all songs of the catalog, which is impractical for very large catalogs. For those reasons, the PMT system preferably decomposes large catalogs into sub-catalogs of a practical size, for example, more preferably between 2000 and 6000 songs for each sub-catalog. The user is, at any time, given recommendations from only one of the sub-catalogs, based on the preferences indicated on the same sub-catalog. When the system finds that the songs most preferred by the user in the sub-catalog have been exhausted (or at least partially explored), the system more preferably moves the user to another sub-catalog.

To be able to make informed recommendations on this new sub-catalog, the preferred "transfer" method has been developed. It allows the PMT system to transfer information about a user from one sub-catalog to another one. To transfer information between two sub-catalogs, a small set of songs (assume for description's sake 100) is preferably selected from each of the two sub-catalogs. Those sets should be chosen in such a way that they span the catalogs as well as possible. A group of raters rates those two sets of songs and a transfer matrix (100×100) of pseudo-distances between each song of the first set and each song of the second set is preferably computed as in the SM method. Assuming the PMT system has information about the preferences of a user about songs from the first catalog, the system more preferably computes predictions, using the SM matrix of the first catalog, of user preferences concerning the first set of 100 songs (from the first sub-catalog). Using those predictions as if they were a learning set, the method preferably computes, with the help of the transfer matrix, predictions concerning the user's preferences about the second set of songs (from the second sub-catalog). It then more preferably uses these last predictions as if they were a learning set, to make recommendations for the second sub-catalog. Once more information is gathered about the preferences of the user concerning the second sub-catalog, the PMT system optionally and most preferably returns to a normal mode of operation on the second sub-catalog, without reusing the predictions generated by the transfer matrix.

Feature Base

The feature base is another optional but preferred component of the present invention, and is the database containing the analysis of each of the songs of the catalog by musical features. This database allows the construction of the Feature Map and the use of the neural net method. This feature base and the mapping of the catalog along those features are extremely useful for purposes beyond those methods. A user may give an example of a song and request from the PMT system songs that are similar, i.e., close to this song musically.

The feature base enables an active search of the whole catalog along those musical features by the user looking for musical items of a certain type: the PMT system filters the recommendations and recommends only songs that fit the type requested. The feature base also allows a search by examples: given a song, the PMT system can search the catalog for the songs that are closest to the given song in terms of the pseudo-distance used in the Feature Map.

Implementation with a Mobile Device

The principles and operation of the present invention may be better understood with reference to the drawings and the accompanying description.

The present invention has a number of optional but preferred implementations, which are intended as examples only, without any intention of being limiting. As described in greater detail below, these implementations include the provision of a system for distributing musical selections (songs) through a mobile network, shown herein as a cellular telephone network for the purposes of description only and without any intention of being limiting; a server implementation which is useful with the above system; and a method for receiving services according to the present invention through a mobile device, which is preferably a cellular telephone.

FIG. 1 is a schematic block diagram of an exemplary system 68 according to the present invention for interaction with the user through a mobile network with a mobile device. As shown, system 68 features a server 70 for controlling the operation of a number of rating components. Server 70 is in communication with a client 72, which is operated by a user mobile device 74 and which in turn provides the user interface.

Server 70 also preferably features a communication interface 76 for communicating with client 72 through a mobile network, shown as a cellular network 78. Communication interface 76 preferably includes all the modules that are needed for connections (connect, send and receive) to client 72. A control interface 80 controls interactions of client 72 with a recommendation engine 82. Control interface 80 preferably initializes and synchronizes the other components, and also handles exceptions.

Recommendation engine 82 then preferably receives information from a database 84 through a database handler 86. Database 84 maintains all relevant information, including but not limited to, information about the customers, their cellular telephone number(s), musical preferences, previously transmitted songs. Database handler 86 interfaces between recommendation engine 82 and database 84. Recommendation engine 82 also preferably includes the learning algorithms that are used to build the musical taste profile of users. Based on this profile, system 10 is capable of recommending new songs to the user with a high degree of success.

Database 84 preferably includes the tables that are required for running server 70. These tables preferably include, but are not limited to, control tables which include the general information needed for activating the server; song tables which include all the information about songs (e.g., song name, performer name, etc.); company tables which include the information about customers who access the server; a table of users which includes the information on users for each company; and a table of statistics, which includes statistics on usage, the number of users and the amount of users.

A memory management module 88 preferably manages the memory of server 70 and holds information required for running recommendation engine 82, which is preferably loaded into the computer's (server's) main memory. The role of memory management module 88 is to define, build and access the data structures (e.g., vectors and maps) in the memory.

The process flow through the components of server 70 is preferably operated as follows. First, server 70 is initialized. Control module 80 activates Database Handler 86. Control module 80 then initializes Memory Management module 88, which loads all the required information to the memory by sending commands to Database Handler module 86. Communication interface 76 preferably initializes a specific port number for the server (TCP/IP).

Next, for the client cycle, each request from client 72 is preferably placed in a separate thread that is closed by server 70 as soon as the request has been fulfilled. The next request from the same user more preferably opens a new thread.

First, Communication interface 76 receives a "send songs for rating" message from client 72 and passes it to Control module 80. Control module 80 then activates Recommendation Engine 82 that selects a set of songs from the main memory. A reasonable way to select those songs is to select them at random, but other methods may be preferred. Control module 80 receives the song vector and passes it to Communication interface 76. Communication interface 76 sends the set of songs that have been chosen to client 72. Control module 80 sends a disconnect command to Communication interface 76 and stops the client session. This is done in order to minimize the number of threads open at any time.

The user listens to the songs that have been sent, and records whether these songs are preferred. Communication interface 76 receives a "rated songs" message from client 72 when this is done and passes it to the Control module. This message contains the user's ratings.

Control module 80 then preferably activates Memory Management module 88. Control module 80 receives ACK from Memory Management module 88 and passes it to Communication interface 76. Control module 80 sends a disconnect command to Communication interface 76 and stops the client session. Client 72 preferably sends an additional request, "send recommended songs", to receive the recommendations.

Communication interface 76 receives the "send recommended songs" message from client 72 and passes it to Control module 80, which activates the Recommendation Engine 82. Recommendation Engine 82 uses some learning algorithms to recommend and prepare the songs' vectors for recommendation Control module 80 receives the vector and passes it to Communication interface 76.

Communication interface 76 sends list of recommended songs to the client. Control module 80 sends a disconnect command to Communication interface 76. Control module 80 stops the client session.

Optionally and preferably, during each session, the database tables and the statistics tables are updated. Each session serves a single user. Multiple sessions can exist simultaneously on separate threads.

Figure 2:
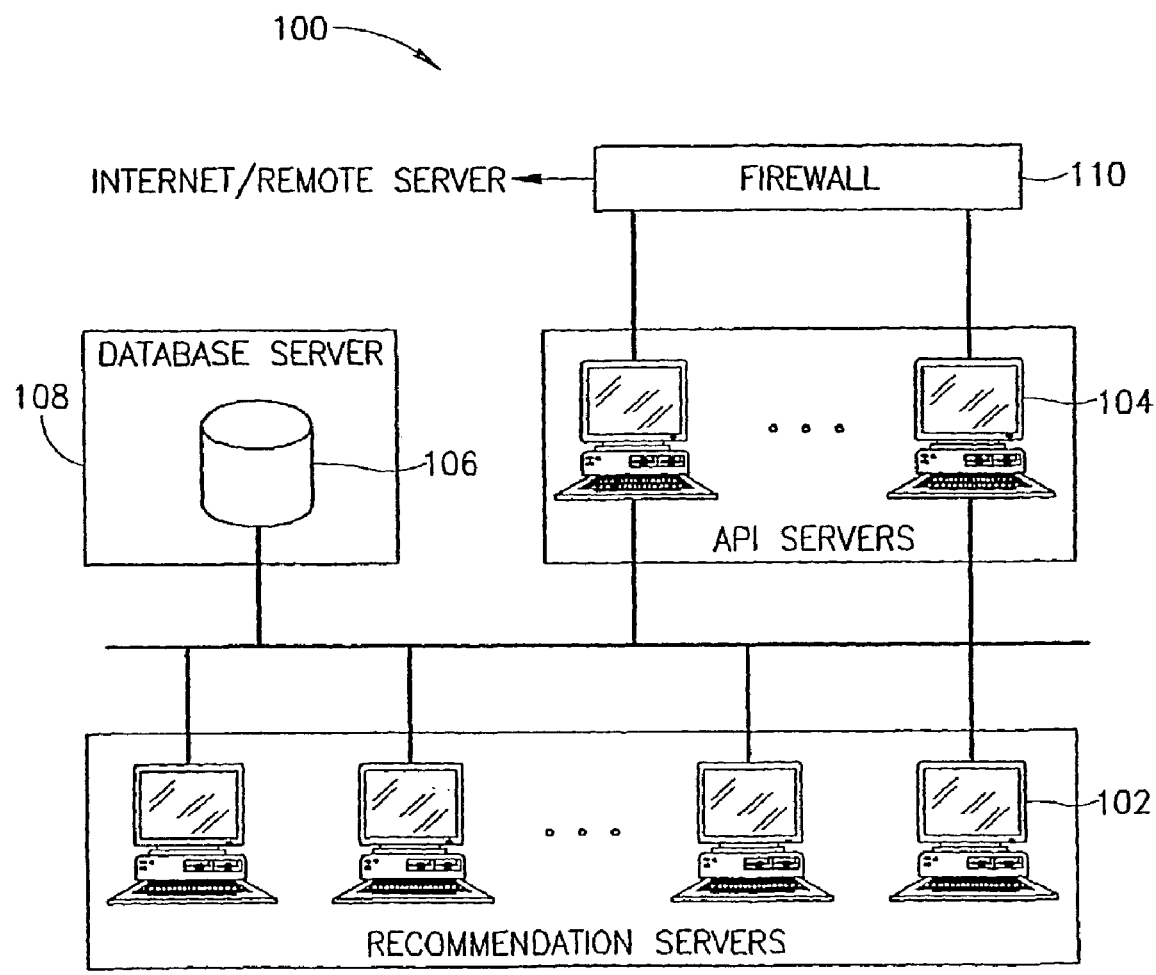
FIG. 2 is a schematic block diagram of an exemplary server implementation according to the present invention.

FIG. 2 shows an exemplary server implementation according to the present invention. As shown, a server 100 features a plurality of recommendation servers 102, for performing the previously described recommendation functions of the present invention. Recommendation server 102 preferably receives information about the taste of the user and the request for making the recommendation from one of a plurality of API servers 104. Each API server 104 may optionally include an HTTP server and an application server (not shown) for parsing the request, retrieving user data from a database 106 through a database server 108, and then sending a reply. More preferably, the reply is sent in XML (extended mark-up language).

Server 100 also preferably features a firewall 110 for protection, and also optionally for performing load-balancing functions.

The operation of the present invention with regard to these exemplary implementations of a system and a server, respectively, is more preferably as follows. First, the customer preferably accesses services according to the present invention by calling the voice mail associated with the mobile device, or any number designated to that effect. The user is preferably greeted by the "main menu".

Simple Search Option

By choosing the "Simple Search" option from the main menu, the user receives a sequence of a plurality of songs (whether as full length or excerpts). The user more preferably does not need to submit requests. The PMT system uses the information gathered with regard to the taste of the user, as previously described, to transmit songs of interest. Optionally and more preferably, the user may rate the transmitted songs. If such a rating is performed, the accuracy of the Simple Search is expected to improve for a closer match to the personal taste of the user. Also optionally, if the system has no information about the taste of the user, the user is asked to rate one or more songs. Alternatively, the PMT system can gather information about the user's taste indirectly from a log file of prior actions including but not limited to, listening to music, saving music in a folder or buying musical items, or a combination thereof This service enables the user to search, with a minimal effort, a large catalog of songs and find songs of interest. The user may then optionally buy, save, send such songs, and/or continue searching, or a combination thereof.

Personalized Musical Card

With this optional but preferred embodiment, the user can send a song to another user, based on the recipient's musical preferences. The user preferably first types in, or otherwise enters, the cellular phone number of the recipient. The PMT system of the present invention then searches a database for the musical preferences of the recipient, and suggests one or more songs that match the personal taste of the recipient. The user can preferably choose a song from the suggested songs, add a dedication and send this combination as a "Musical Card", being assured that the recipient would enjoy the song.

Similar Songs

Based on the musical properties of each song, the PMT system preferably automatically identifies songs that sound like a specific reference song. Similar songs are determined by the Feature Base described above. When listening to a song, the user can then optionally and more preferably ask for one or more songs that sound like the reference song. The user then optionally and most preferably buys the song, saves the song, sends this similar song to any telephone number, or continues the search, or a combination thereof Daily Recommendation The user can also optionally and more preferably subscribe to a daily recommendation service via voice mail. Based on the user's personal musical taste, the system preferably sends a daily recommendation to the user's voice mail. The user can also find the daily-recommended song by selecting "daily recommendation" from the main menu.

My Favorites

This option preferably stores at least a portion of, and more preferably all, songs that have been given a high rating by the user in a folder opened to that effect by the voice mailbox.

New Releases for Me

This option in the main menu preferably triggers the broadcast of new releases chosen by the network provider that fit the personal taste of the customer, more preferably as determined by the PMT system. Alternatively or additionally, this option gives the customer access to a folder from which those new releases are drawn. The PMT system preferably receives a list of new releases from the network provider, and decides which of those releases fit the personal taste of the customer. This service optionally and most preferably permits tightly targeted promotions of musical content.

Special Occasions

Network providers may optionally wish to offer songs particularly suitable for special occasions such as: birthday, romantic evening and so on. The mood of a song (happy/ rhythmic, sad/depressed, romantic/sentimental, aggressive/ nervous) is preferably one of the musical features of the PMT's database, and more preferably is the result of careful analysis by trained musicians. Using these mood characteristics, the PMT system can optionally and preferably create and maintain such folders of songs, for example: cheer-up music for a sad friend, or romantic music for a loved one.

Searching Music by Musical Properties

The PMT preferably permits music to be searched by musical properties (genre, mood, instruments, language . . . ). Such a search may optionally be proposed to the customer of a wireless provider. An advanced user interface, such as a Web page provided through WAP (wireless application protocol) for example, is preferred to support the presentation of the result of this search, more preferably as a list of songs that satisfy all (or at least a significant portion of) the properties which are defined by the user.

Guided Recommendations

The user can optionally and preferably define musical properties like genre and language and ask for recommendations along those properties. The PMT system considers the songs of the catalog that fit those properties, and then preferably predicts which of those songs are liked by the customer and broadcasts those songs predicted to be preferred by the customer. As above, an advanced interface is preferred in order to specify the properties by which to search.

Personal Channel

The "personal channel" is an optional but preferred feature of the present invention for delivering high quality music that fits the taste of the user through the wireless network, to the mobile device of the user, such as a cellular telephone for example. The personal channel is more preferably based on the "Simple Search" service. The songs recommended are preferably played one after the other, more preferably without the need for submitting requests. It may also optionally and preferably benefit from an advanced interface.

Support for Multiple Profiles

The PMT system may offer the customer the possibility of defining a number of different profiles, i.e., musical identities. The user can optionally create a profile for any situation or mood, for example for exercising.

Basic Features Needed to Implement those Services

For performing the services above the PMT system requires information about the musical taste of the customer. This information may optionally be collected indirectly in a number of ways from the record of previous actions of the customer, but the PMT system also preferably allows the customer to rate a song by pressing one of a number of designated keys on the mobile device while listening to the song. A scale of three values, represented by three different keys is more preferably implemented for greater ease in the wireless environment: a key for "like", one for "So-So" and one for "do not like". Alternatively, another scale may be used if advantageous. Pressing the "do not like" key most preferably automatically interrupts the current song and begins the next song to be broadcasted.

While the invention has been described with respect to a limited number of embodiments, it will be appreciated that many variations, modifications and other applications of the invention may be made.

BIBLIOGRAPHY

LeCun:85 Yves Le Cun. *Une procedure d'apprentissage pour reseau a seuil assymetrique*. In Proceedings of Cognitiva, pages 599–604, Paris, France, 1985.

BackProp:86 D. E. Rumelhart, G. E. Hinton, and R. J. Williams. *Learning internal representations by error propagation*. In Rumelhart and McClelland, editors, Proc. of Structure in Complexity Theory, volume 1, chapter 8, pages 318–362. MIT Press, Cambridge, Mass., 1986.

CollFilt:95 U. Shardanand and P. Maes. *Social Information Filtering: Algorithms for Automating "Word of Mouth"*. In Proceedings of CHI'95 May 1995, Denver, Colo. ACM Press.

APPENDIX

An initial set of features was defined as follows: Rock, Jazz, Electric, Rhythm Section, Female, Male, Duo+, Strings, Brass, Piano, Phase, Acoustic Guitar, Not Expressive, Expressive, Very Expressive, In Tune and English. The 90 features currently in use are described below.

Musical Parameters

Genre

1. Pop & Rock all pop and rock music as from late 50's, including Elvis Presley, Beatles, Heavy rock, Madonna etc.
2. Jazz all Jazz types including blues, bebop, standards, vocal jazz, big band etc.
3. Latin+ South American music, Latin rhythms (Tango, Salsa, Samba, etc.)
4. Electric Instruments Instrumental piece performed only by Electronic music
5. Rap+Black all rap, reggae, R & B, Afro-American music,
6. Country+Folk including all folk music and folk-like music such as French chansons. Generally referring to European and North-American music.
7. Easy Listening+Oldies including musicals and light music, usually accompanied by large symphony orchestra or big band.
8. World Songs from exotic cultures (African, East-Asian, various tribes etc.) usually combining western musicians and/or instruments. Also East-West combinations.
9. Classical
10. Reggae—Music from Jamaica.
11. Eretz-Yisrael—Nostalgic Israeli music
12. Pop mizrahi—Middle Eastern pop music (Greek, Arabic and similar)
13. Other Decades Parameter to be filled during the pre-processing phase Structure Intro/Outro—A substantial piece of music preceding the song (very long opening of a significant musical value). Also when coming at the end of a song. Does not include common fade-out in song.

Performer

1. Male—male singer soloist
2. Female—female singer soloist
3. Duo+—any amount of singers of equal importance (from duo and trio up to an entire choir)
4. Instrumental—A piece with no singers. Singers may appear in accompanying vocal parts and would then be identified as "voices" in the "Accompaniment 2" section.

How Performs? (Expressiveness)

1. Relaxed-Lively—Regular type of singing, relaxed mood, no special expression, no vocal effects, singing in middle register of singer, restrained.
2. Sad/Depressed—Expressing sadness, calm, slow, low-keyed, "broken" voice, leading to tears, sad or similar text.

3. Dramatic Expression—High register, using vocal effects screaming, "whispering loud", speaking assertively.
4. Excited/Passionate—Personal expression of feelings, songs describing love and feelings towards loved ones. Including special vocal effects: heavy breathing, whispering-low register, breaking voice and sighs.
5. Changing Voice Volume—Moving from low volume to high volume, from screaming to whispering and vice versa, usually in dramatic expression.
6. Glissando—special voice technique that usually uses sliding pitch in both directions. Also sliding down in end of sentences.
7. High register/screaming—using the high part of the voice, using a lot of power and energy to express emotions and expression.
8. Heavy breath/sigh—very strong voice effects, used to get passionate expression.
9. Falsetto—male head voice, high register. In contrast to screaming—no special effort is used to produce this voice.
10. Reciting/declamation—used for rhythm effects, and for dramatic expression.
11. Raspy—hoarse, using a lot of pressure on the vocal chords
12. Phlegmatic/indifferent—flat, objective singing, without emotions
13. Artistic/classical—using a voice development technique with dramatic intentions.
14. Whisper—singing or speaking without voice or hardly any voice, for passionate or dramatic expression.
15. Ethnic—Singing in oriental (mizrahi), Arabic or African style Accompaniment 1
1. Rhythm section—bass, drums and electric guitar. Could also be used in separate functions
2. Piano—including acoustic piano and electric piano
3. Acoustic guitar—including classical guitar
4. Melodic percussion—vibraphone, marimba, xylophone, Carribean drums etc.
5. Keyboard—All kinds of keyboards, except for piano and electric piano.
6. Guitar+—All kinds of guitars and pluck-instruments.
7. Fuzz—Any distorted guitar.

Accompaniment 2
1. Acoustic lines—any acoustic instrument or section, including imitation of acoustic instruments (except piano and acoustic guitar) and including sustained effects.
2. Symphony orchestra based on strings orchestra
3. Electric effects not including electric piano and organ
4. Voices one or more singers in addition to the solo singer
5. Sustain long, steady sound effect, including strings, electric, organ, voices etc.
6. Strings+—Violin, cello, viola, contrabass etc.
7. Brass—Any size of brass section or orchestra.
8. Woodwind—Any size of woodwind section or orchestra.
9. Percussion—Any percussion instruments that are not a part of the regular drum-set (tambourine, maracas, etc.).
10. Melodic Percussion—Including vibraphone, marimba, xylophone, Caribbean drums etc.
11. Harmonics+—Including bagpipe, harmonica, accordion, harmonium etc.
12. Exotic—Far Eastern, Middle-Eastern, African and unique instruments.

Solo/Dominant Instrument

Instrumental solo or main part that is of soloistic importance. Also when accompanying a singer. The instrument has to play a significant part to be considered as solo instrument i. Accordion
ii. Acoustic guitar
iii. Bagpipe
iv. Banjo
v. Bass
vi. Cello
vii. Clarinet
viii. Electric Guitar
ix. Exotic Strings
x. Flute
xi. Harmonica
xii. Horn
xiii. Melodic Percussion
xiv. Oboe
xv. Percussion
xvi. Piano
xvii. Saxophone
xviii. Keyboard
xix. Trombone
xx. Trumpet
xxi. Violin Accompaniment Expressiveness
1. Build to crescendo
2. Ostinato/repetitive line including rhythmic or melodic elements, appearing three times or more
3. Intensive orchestration large orchestra, orchestrated in many parts
4. Rhythmic breaks change of beat within a song, usually used to give "drive" to the song
5. Organ point—including all instruments, sustaining one note.

Solo/Dominant Instrument

Instrumental solo or main part that is of soloistic importance. Also when accompanying a singer. The instrument has to play a significant part to be considered as solo instrument Language
1. English
2. Hebrew
3. French
4. Spanish
5. Portuguese
6. Italian
7. German
8. Other—including gibberish Tempo Tempo is not determined. Rather, the "feeling" of the song is measured, and is related to the subdivision of quarter notes and in which meter the song is performed. Nevertheless tempo can be generally described as:
1. fast—over 120 M.M.
2. medium—60–120 M.M.
3. slow—under 60 M.M.

The tempo is set according to a BPM program. The mapper clicks on the Left-click of the BPM-bar, beats on the keyboard space bar 6–7 times and the computer calculates the BPM accordingly.

Rhythm Feel
1. Fast Cymbals+—Fast cymbals or cymbal-like instruments that play $\frac{1}{16}$ notes (or more).
2. Swing Feel—Swing eights, a non-even feel.

Ethnic Motives

Middle-Eastern motives, $\frac{1}{4}$ tones, melismas, complex meters, special instruments.

Text

Ballad/story—These songs are usually musically recognized by giving the text the major importance and usually neglecting the musical part, i.e. dull melodic line and harmony, singer often sings in a monotonic way. Often there is a line repeating at the end of each verse, that concludes the verse's text. The ballads may rhyme badly, as the content of the text plays a more important role.

Repetitive words—as repetitive words are assumed to make the song more catchy, this feature applies to words or idioms that appear 3 times or more in a song ("She loves you", "sha la la la la", etc.) "Words" also include syllables and gibberish repeated words.

Understandable—in this parameter, clarity of the text being sung for the listener is determined. This does not apply to deep understanding of the content but to the diction of the singer and to the importance he/she gives to the song.

Harmony

Simple change—a song based on simple harmonic steps (I-IV-V-I or similar), and a little changes during the song, with no many blue notes, 9-11-13 chords or modulations.

Dense change/chromatic—using more sophisticated harmony, 9-11-13 chords (jazz), chromatic steps in the bass or in the melody, also referring to a lot of chord changes in a short time.

Modulation—scale change during the song. It has dramatic expression, especially when it comes towards the end of the song. This parameter is also used for key-shifts or jumps.

Surprise—using unusual chords in the harmonic continuity, with any preparation.

Meter

Double using dual meter during complete song (2/4, 4/4, 6/8 etc.)

Triple using triple meter during complete song (3/4, 3/8 etc.)

Complex/mixed using combination of double and triple meters in one song, or using complex meters (7/8, 9/16, 11/16 etc.)

Mood Functions
1. Happy/Rhythmic—95–120+ BPM. Dynamic, energetic, sweet, light, Catchy, clear, free.
2. Sad/Depressed—0–100 BPM, minor scale. Honest, melancholy, fragile voice, expressing pain, leading to tears, sad lyrics, Blues.
3. Romantic/Sentimental—0–100 BPM, major scale. Sexy, sensual, full of emotions, romantic lyrics, sustain, group of violins, full of pathos.
4. Aggressive/Nervous—Heavy sound, full of tense, cruel, thick, screeching-dissonant tunes, screams.

Rhythmic Patterns:
1. Rock 'n Roll
Rock Ballad
Shuffle Rock
Rock Funk
Heavy Rock
Pop Rock
Soft Rock
Fast Rock
Latin Rock
Twist Rock
Disco rock
Country Rock
Rock Soca
Rock Loops
Rock in ¾
Rock March
Twist
Moroccan
2. Slow Rock
Slow Rock
3. Funk
Funk Ballad
Slow Funk
Shuffle Funk
Latin Funk
Fast Funk
Medium Funk
Funk Loops
Pop Funk
Jazz Funk
Funk Disco
4. Swing
Medium Swing
Ballad
Fast Swing
Basie Groove
Dixieland
Shuffle Swing
Jazz Waltz
Latin Jazz
Charleston
Tarantella
5. Mambo Clave
Mambo
Songo
Afro-Cuban 6/8
Mozambique
Bolero
Fast latin
Calipso
Latin Folklore
Beguine
6. Cha-Cha
Cha-Cha
7. Brazilian Bossa
Bossa Nova
8. Samba
Medium Samba
Fast Samba
Samba Batucada
Funk Samba
Disco Samba
9. Disco
Disco
Disco Esta
Haus Disco
March
10. Esta
Esta
11. Waltz
Waltz
12. Tango
Tango
13. Reggae
Reggae
14. Techno
Haus
Techno
15. Rap
Rap
Jungle
Hip-Hop
Acid Jazz 16. Makluby Makluby Maksum Masmudi Sarir Rating
1. It's great!
2. I like it
3. It's so-so
4. I don't like it
5. I can't stand it

What is claimed is:

1. A method for predicting a preference of a user for a musical selection, the method comprising:

analyzing a catalog of musical items according to a plurality of internal musical characteristics;

playing at least one musical selection comprising a plurality of items, having analyzed internal characteristics, to a user and receiving from said user a respective rating of each item of said at least one musical selection;

matching said rating with the corresponding analyzed internal characteristics to predict the preference of the user for further musical items from the catalog; and using said prediction, recommending at least one predicted musical item to the user;

wherein at least one of said playing, and said recommending is performed through a mobile device connected to a wireless network.

2. The method of claim 1, wherein a plurality of matching processes are used to match said rating with said plurality of characteristics.

3. The method of claim 1, wherein a matching process is a neural network, such that said plurality of characteristics of said musical items forms a binary vector and said neural network learns to match said binary vector to characteristics of each rated musical item by the user.

4. The method of claim 1, wherein a matching process is a map method for creating a matrix of pseudo-distances between each pair of musical items, for comparing each rated musical selection to at least one other musical selection in said catalog.

5. The method of claim 4, wherein said map method is a selection map method, for comparing all characteristics of each pair of musical items.

6. The method of claim 4, wherein said map method is a feature map method, for comparing a selected group of features of each pair of musical items.

7. The method of claim 4, wherein said map method is a fingerprint map method, for comparing a selected group of features of each pair of musical items.

8. The method of claim 1, wherein a matching process is a rating method for rating each musical item of said catalog and directly comparing each rating of the user to said rating for said musical item of said catalog.

9. The method of claim 1, wherein information about each musical item in said catalog is stored in a feature base.

10. The method of claim 1, wherein each musical item is also characterized by genre.

11. The method of claim 1, wherein said musical item is analyzed along musical features by a trained musician.

12. The method of claim 1, wherein said musical item is rated by a plurality of users.

13. The method of claim 1, wherein said musical item is automatically analyzed according to a fingerprint of the audio signal.

14. The method of claim 1, further comprising:

purchasing a musical item by the user.

* * * * *